United States Patent
Lee

(10) Patent No.: US 10,668,858 B2
(45) Date of Patent: Jun. 2, 2020

(54) AROUND VIEW MONITORING SYSTEM AND OPERATING METHOD THEREOF

(71) Applicant: HYUNDAI MOBIS CO., LTD., Yongin-si, Gyeonggi-do (KR)

(72) Inventor: Seong Soo Lee, Jincheon-gun (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 361 days.

(21) Appl. No.: 15/634,972

(22) Filed: Jun. 27, 2017

(65) Prior Publication Data
US 2018/0050638 A1 Feb. 22, 2018

(30) Foreign Application Priority Data

Aug. 16, 2016 (KR) .......... 10-2016-0103589

(51) Int. Cl.
*B60R 1/00* (2006.01)
*G06K 9/46* (2006.01)
(Continued)

(52) U.S. Cl.
CPC .......... *B60R 1/002* (2013.01); *G06K 9/00798* (2013.01); *G06K 9/4604* (2013.01); *G06K 9/4633* (2013.01); *G06K 9/6202* (2013.01); *G06T 3/60* (2013.01); *G06T 7/246* (2017.01); *G06T 7/269* (2017.01); *G06T 7/277* (2017.01); *G06T 7/70* (2017.01); *G06T 7/73* (2017.01); *H04N 5/247* (2013.01); *B60R 2300/105* (2013.01); *B60R 2300/30* (2013.01); *B60R 2300/802* (2013.01); *G06T 2207/20061* (2013.01); *G06T 2207/20076* (2013.01);
(Continued)

(58) Field of Classification Search
CPC G06T 7/246; G06T 7/269; G06T 7/73; G06T 7/277; G06T 7/70
See application file for complete search history.

(56) References Cited

U.S. PATENT DOCUMENTS

2012/0176492 A1* 7/2012 Garin .................. G06T 7/70
348/116
2015/0332114 A1* 11/2015 Springer .............. G06K 9/4604
348/148

FOREIGN PATENT DOCUMENTS

KR 10-2017-0114523 A 10/2017

OTHER PUBLICATIONS

D. Scaramuzza and R. Siegwart, "Appearance-Guided Monocular Omnidirectional Visual Odometry for Outdoor Ground Vehicles," in IEEE Transactions on Robotics, vol. 24, No. 5, pp. 1015-1026, Oct. 2008.URL: http://ieeexplore.ieee.org/stamp/stamp.jsp?tp=&arnumber=4625958&isnumber=4663225 (Year: 2008).*

* cited by examiner

*Primary Examiner* — Jamie J Atala
*Assistant Examiner* — Hesham K Abouzahra
(74) *Attorney, Agent, or Firm* — Knobbe Martens Olson & Bear LLP

(57) ABSTRACT

The present invention is directed to providing an around view monitoring system (AVMS) that may enhance accuracy of an estimation of a camera attitude while a road gradient is present, and an operating method thereof. According to an embodiment of the present invention, the AVMS may calculate a rotation matrix for removing a road gradient component using a camera that has not changed position and generate an estimated rotation matrix from which the road gradient is removed by applying the rotation matrix to an estimated rotation matrix for a camera that has changed position.

6 Claims, 6 Drawing Sheets

(51) Int. Cl.
*G06T 7/246* (2017.01)
*G06T 7/269* (2017.01)
*G06T 3/60* (2006.01)
*G06T 7/277* (2017.01)
*G06T 7/73* (2017.01)
*G06T 7/70* (2017.01)
*G06K 9/00* (2006.01)
*G06K 9/62* (2006.01)
*H04N 5/247* (2006.01)

(52) U.S. Cl.
CPC ............... *G06T 2207/30244* (2013.01); *G06T 2207/30256* (2013.01)

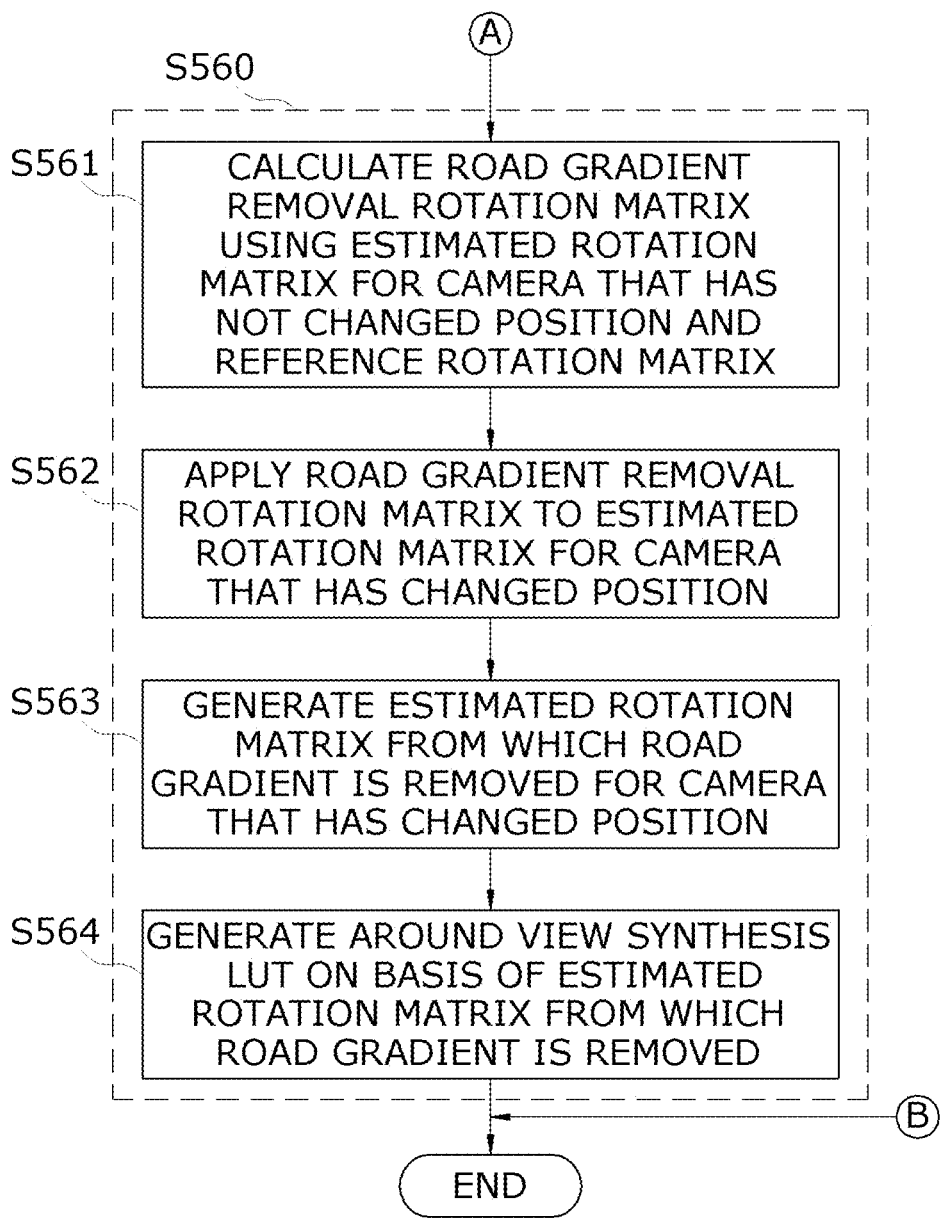

US 10,668,858 B2

AROUND VIEW MONITORING SYSTEM AND OPERATING METHOD THEREOF

CROSS-REFERENCE TO RELATED APPLICATION

This application claims priority to and the benefit of Korean Patent Application No. 2016-0103589, filed on Aug. 16, 2016, the disclosure of which is incorporated herein by reference in its entirety.

BACKGROUND

1. Field of the Invention

The present invention relates to an around view monitoring system (AVMS), and more particularly, to an AVMS that may enhance accuracy of an estimation of a camera attitude while a road gradient is present and an operating method thereof.

2. Discussion of Related Art

An around view monitoring system (AVMS) of a vehicle is a system that receives images from four cameras installed in the vehicle and shows the vehicle's surroundings from a bird's eye view.

Such an AVMS, which uses images captured by a plurality of cameras, essentially requires that tolerances be corrected when the cameras are assembled therein. To this end, each vehicle manufacturer corrects tolerances for a vehicle equipped with an AVMS to satisfy matching of an around view image and then releases the vehicle.

However, although a vehicle which has corrected tolerances is released, the tolerances corrected upon the release are changed due to various environmental factors such as vibration of the vehicle during driving, folding of side mirrors of the vehicle, and opening or closing of a door of the vehicle, and thus matching of an image is deteriorated.

Accordingly, such an image matching issue causes a decrease in reliability and stability because a driver operates by referencing a distorted around view image while driving or parking. To solve the image matching issue, the changed tolerances should be corrected.

However, it is cumbersome to visit a service center or office capable of tolerance correction to correct the tolerances.

Accordingly, there is a need for an AVMS for correcting a tolerance when the tolerance is changed and providing a matching around view image.

SUMMARY OF THE INVENTION

The present invention is directed to providing an around view monitoring system (AVMS) that may enhance accuracy of an estimation of a camera attitude while a road gradient is present, and an operating method thereof.

According to an aspect of the present invention, there is provided an AVMS including an image capture unit configured to acquire images by performing capturing in front of, behind, to a left side, and to a right side of a vehicle using cameras; a feature point extraction unit configured to extract ground feature points from each of the images acquired by the image capture unit; a camera attitude estimation unit configured to estimate a rotation angle for each of the cameras with reference to a ground surface using the ground feature points and generate an estimated rotation matrix including the estimated rotation angle, and an around view generation unit configured to determine whether a road gradient is present on the basis of the estimated rotation matrix of each of the cameras and generate an around view synthesis lookup table (LUT) on the basis of the currently generated estimated rotation matrix or generate an estimated rotation matrix from which the road gradient is removed and generate the around view synthesis LUT on the basis of the estimated rotation matrix from which the road gradient is removed.

The around view generation unit may be configured to compare an estimated rotation matrix for a camera that has not changed position, which is input from the outside, with a reference rotation matrix that is prestored in association with the camera and determine whether a road gradient is present.

The around view generation unit may be configured to determine that no road gradient is present when the estimated rotation matrix is the same as the reference rotation matrix and determine that a road gradient is present when the estimated rotation matrix is different from the reference rotation matrix.

When no road gradient is present, the around view generation unit may be configured to generate the around view synthesis LUT on the basis of the currently generated estimated rotation matrix.

When a road gradient is present, the around view generation unit may be configured to generate the estimated rotation matrix from which the road gradient is removed and generate the around view synthesis LUT on the basis of the estimated rotation matrix from which the road gradient is removed.

The AVMS of claim 5, wherein the around view generation unit is configured to calculate a rotation matrix for removing a road gradient component, generate the estimated rotation matrix from which the road gradient is removed by applying a road gradient removal rotation matrix to an estimated rotation matrix for a camera that has changed position, and generate the around view synthesis LUT on the basis of the estimated rotation matrix from which the road gradient is removed.

The around view generation unit may be configured to calculate the road gradient removal rotation matrix through an equation $[R_{road\ gradient\ removal} \times R_{estimate} = R_{reference}]$.

According to another aspect of the present invention, there is provided an operating method of an AVMS, the operating method including acquiring images by performing capturing in front of, behind, to a left side, and to a right side of a vehicle using cameras; extracting ground feature points from each of the acquired images; estimating a rotation angle for each of the cameras using the ground feature points and generating an estimated rotation matrix including the estimated rotation angle; determining whether a road gradient is present by comparing an estimated rotation matrix for a camera that has changed position with a reference rotation matrix; and generating an around view synthesis LUT on the basis of the currently generated estimated rotation matrix or generating an estimated rotation matrix from which the road gradient is removed and generating the around view synthesis LUT on the basis of the estimated rotation matrix from which the road gradient is removed, depending on a result of determining whether a road gradient is present.

The determining of whether a road gradient is present may include comparing an estimated rotation matrix for a camera that has not changed position, which is input from the outside, with a reference rotation matrix that is prestored in association with the camera to determine whether a road gradient is present.

The determining of whether a road gradient is present may include determining that no road gradient is present when the estimated rotation matrix is the same as the reference rotation matrix and determining that a road gradient is present when the estimated rotation matrix is different from the reference rotation matrix.

The generating of an around view synthesis LUT may include generating the around view synthesis LUT on the basis of a current estimated rotation matrix when no road gradient is present; and generating the estimated rotation matrix from which the road gradient is removed and generating the around view synthesis LUT on the basis of the estimated rotation matrix from which the road gradient is removed when the road gradient is present.

The generating of the around view synthesis LUT on the basis of the estimated rotation matrix from which the road gradient is removed may include calculating a rotation matrix for removing a road gradient component, generating the estimated rotation matrix from which the road gradient is removed by applying a road gradient removal rotation matrix to the estimated rotation matrix for the camera that has changed position, and generating the around view synthesis LUT on the basis of the estimated rotation matrix from which the road gradient is removed.

The road gradient removal rotation matrix may be calculated through an equation $[R_{road\ gradient\ removal} \times R_{estimate} = R_{reference}]$.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 5A and 5B are flowcharts showing of an operational sequence of an AVMS according to an embodiment of the present invention.

DETAILED DESCRIPTION OF EXEMPLARY EMBODIMENTS

Figure 1:
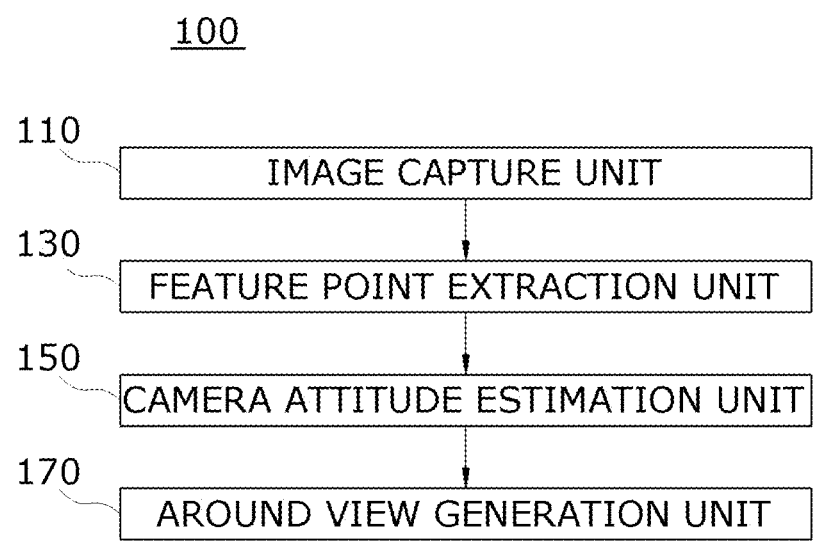
FIG. 1 is a diagram showing a configuration of an around view monitoring system (AVMS) according to an embodiment of the present invention.

For purposes of describing example embodiments of the present invention, specific structural and functional details disclosed herein are merely representative and the present invention may be embodied in many alternate forms and is not be construed as limited to only the example embodiments set forth herein.

Accordingly, while example embodiments of the invention may be variously modified and have alternative forms, embodiments thereof are shown by way of example in the drawings and will herein be described in detail. However, it should be understood that there is no intent to limit example embodiments of the present invention to the particular forms disclosed. On the contrary, example embodiments are to cover all modifications, equivalents, and alternatives falling within the scope of the invention.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of example embodiments of the present invention.

It should be understood that when an element is referred to as being "connected" or "coupled" to another element, the element can be directly connected or coupled to the other element or intervening elements may be present. Conversely, when an element is referred to as being "directly connected" or "directly coupled" to another element, there are no intervening elements present. Other words used to describe a relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments of the invention. As used herein, the singular forms "a," "an," and "the" are intended to include the plural forms as well unless the context clearly indicates otherwise. It should be further understood that the terms "comprises," "comprising," "includes," "including," and/or "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should be further understood that terms, e.g., those defined in commonly used dictionaries, should be interpreted as having a meaning that is consistent with their meaning in the context of the relevant art and are not to be interpreted in an idealized or overly formal sense unless expressly so defined herein.

It should also be noted that in some alternative implementations, functions/acts noted in a specific block may occur out of the order noted in the flowchart. For example, two blocks shown in succession may in fact be executed substantially concurrently or may sometimes be executed in a reverse order depending upon the functionality/acts involved.

The applicant of the present application has proposed Korean Patent Application No. 10-2016-0041591, which was previously filed, entitled "Apparatus and method for correcting automatic driving tolerance for AVAM." A method of correcting an automatic driving tolerance for an AVM according to Korean Patent Application No. 10-2016-0041591, which was previously filed by the present applicant, includes extracting and matching ground feature points using front, rear, left, and right cameras; estimating attitudes of the front, rear, left, and right cameras; determining differences between a reference angle and the estimated attitudes; generating an around view synthesis lookup table (LUT) from the attitudes of the front, rear, left, and right cameras; detecting a traffic line or a stop line in an around view image; and determining and correcting matching of an AVM boundary using the traffic line or the stop line.

A camera attitude is estimated to correct tolerances as stated above, and the estimation of the camera attitude requires an assumption that a ground surface is flat, but an actual road has a longitudinal gradient and a transverse gradient.

Accordingly, the longitudinal gradient and the transverse gradient should be considered in order to enhance accurate matching of a composite around view image.

Hereinafter, an around view monitoring system (AVMS) and an operating operation thereof according to an embodiment of the present invention will be described in detail with reference to the accompanying drawings.

FIG. 1 is a diagram showing a configuration of an AVMS according to an embodiment of the present invention.

Referring to FIG. 1, the AVMS (hereinafter referred to as a "system") 100 may include an image capture unit 110, a feature point extraction unit 130, a camera attitude estimation unit 150, and an around view generation unit 170.

The system 100 includes at least one or more processors for performing functions and at least one or more memories for storing an algorithm, a program, or the like needed to perform the functions.

For example, the feature point extraction unit 130, the camera attitude estimation unit 150, and the around view generation unit 170 may be implemented by a single processor or different processors.

The image capture unit 110 is installed in a vehicle and configured to acquire images of the surroundings of the vehicle. In particular, the image capture unit 110 includes a front camera, a rear camera, a left camera, and a right camera to capture images in four directions, i.e., in front of, behind, to the left of, and to the right of the vehicle.

The images captured by the image capture unit 110 are used to acquire an around view image.

Figure 2:
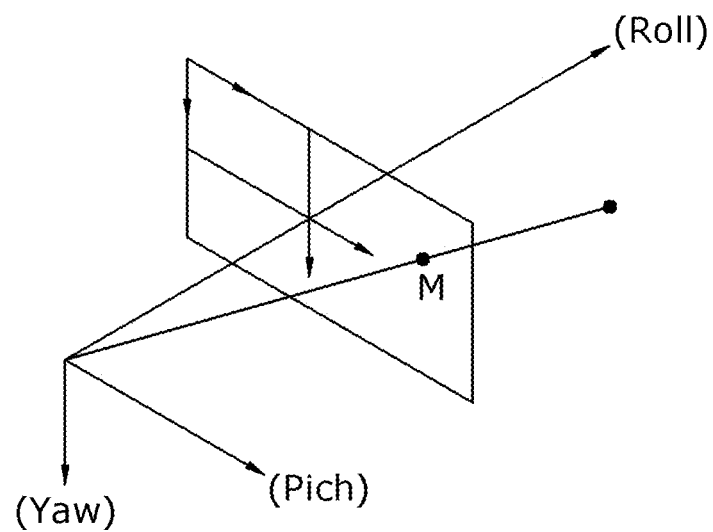
FIG. 2 is a diagram showing a coordinate system of an image capture unit according to an embodiment of the present invention.

FIG. 2 is a diagram showing a coordinate system of an image capture unit according to an embodiment of the present invention. Referring to FIG. 2, a focal point of a camera in a three-dimensional plane is an origin, a front direction is a direction of a z axis, a downward direction is a direction of a y axis, and a right direction is a direction of an x axis.

A feature point M captured by each of the cameras of the image capture unit 110 may be expressed as (x, y, z). The x axis may be represented as Pitch, the y axis may be represented as Yaw, and the z axis may be represented as Roll.

Figure 3A:
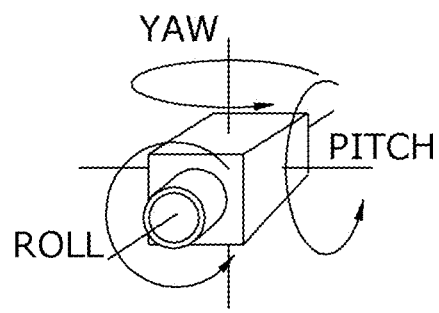
FIG. 3A is a diagram showing image capture unit according to an embodiment of the present invention.
Figure 3B:
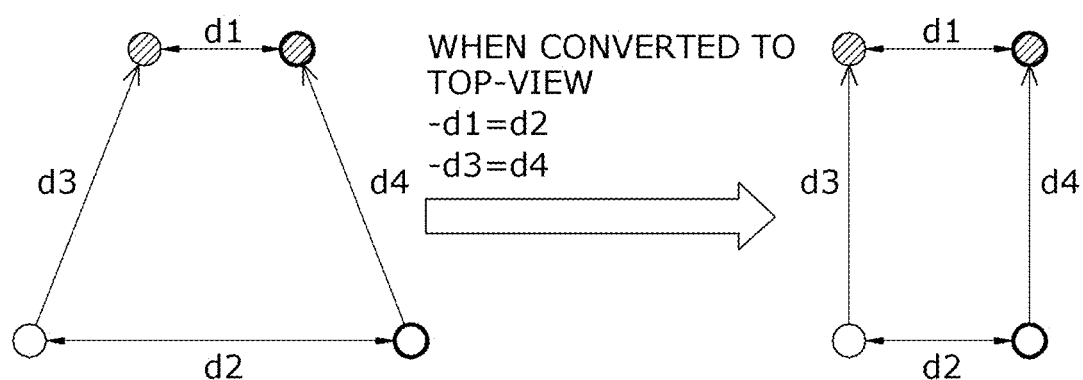
FIG. 3B is a diagram showing a method of converting image captured by an image capture unit as shown in FIG. 3A into a top-view image according to an embodiment of the present invention.

FIG. 3A is a diagram showing image capture unit according to an embodiment of the present invention, and FIG. 3B is a diagram showing a method of converting image captured by an image capture unit as shown in FIG. 3A into a top-view image according to an embodiment of the present invention.

In FIG. 3B, a left drawing shows the images captured by the image capture unit, and a right drawing shows the top-view image acquired by converting the captured image shown in the left drawing.

Referring to FIG. 3B, since the cameras included in the image capture unit 110 are not perpendicular to a ground surface, captured images are as shown in left drawing of FIG. 3B. Subsequently, images that seem to be captured while the cameras are perpendicular to the ground surface may be obtained through a top-view conversion, as shown in right drawing of FIG. 3B.

The feature point extraction unit 130 extracts ground feature points from the image captured by the image capture unit 110. Here, the ground feature points refer to common points that may represent features of the ground surface in images that are continuously captured.

Figure 4:
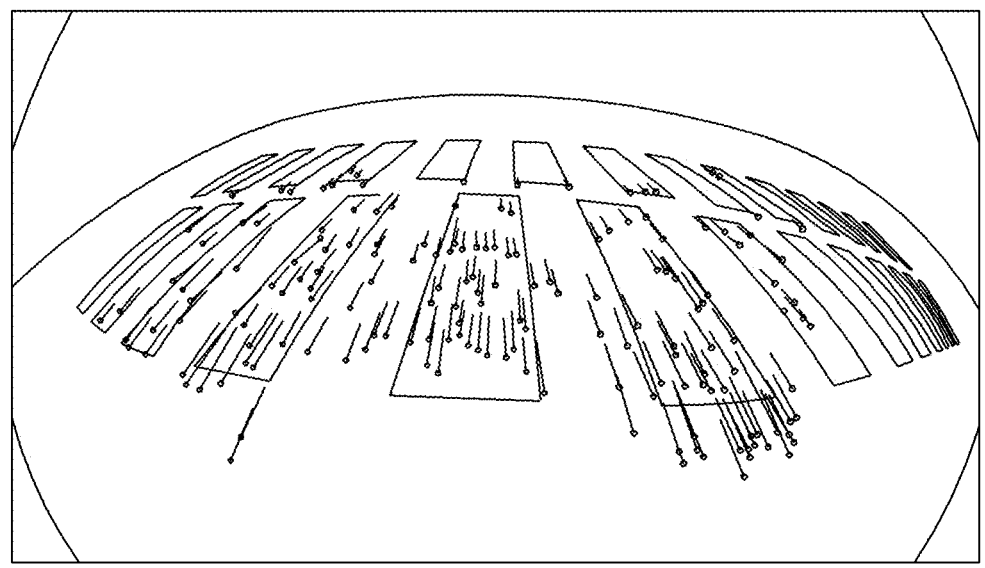
FIG. 4 is a diagram showing feature points extracted by a feature point extraction unit according to an embodiment of the present invention.

FIG. 4 is a diagram showing feature points extracted by a feature point extraction unit according to an embodiment of the present invention.

The feature point extraction unit 130 may extract feature points from continuous images on the basis of an optical flow and perform matching on the feature points.

Also, the feature point extraction unit 130 may calculate a homography (a 3×3 matrix) indicating a correspondence between ground feature points so that only the ground feature points are extracted.

The feature point extraction unit 130 may detect feature points on the basis of various detection algorithms. As an example, the feature point extraction unit 130 may detect feature points using a top-hat filter, a Hough transformation algorithm, a RANSAC-based line fitting algorithm, a Kalman filter, etc. However, the present invention is not limited thereto, and various detection methods may be used.

In order to convert the images captured by the image capture unit 110 into a top-view type around view image, the camera attitude estimation unit 150 estimates a rotation angle for each of the cameras with respect to the ground surface and generates a rotation matrix including rotation angles estimated with respect to the x axis, the y axis, and the z axis.

In this case, the camera attitude estimation unit 150 extracts the x-axis rotation angle, the y-axis rotation angle, and the z-axis rotation angle on the basis of the ground surface. In this case, the feature points extracted by the feature point extraction unit 130 are used.

That is, the camera attitude estimation unit 150 uses the rotation matrix to convert an original image into a top-view image. In order to find the rotation matrix, the camera attitude estimation unit 150 estimates the x-axis rotation angle, the y-axis rotation angle, and the z-axis rotation angle on the basis of feature point patterns and generates an estimated rotation matrix ($R_{estimate}$) including the estimated x-axis rotation angle, y-axis rotation angle, and z-axis rotation angle.

In order to estimate the x-axis rotation angle, the y-axis rotation angle, and the z-axis rotation angle, an x-axis rotation angle, y-axis rotation angle, and z-axis rotation angle that satisfy angle estimation conditions may be pre-learned and prestored in the camera attitude estimation unit 150.

Also, a reference rotation matrix ($R_{reference}$) including the pre-learned x-axis rotation angle, y-axis rotation angle, and z-axis rotation angle may be prestored in the camera attitude estimation unit 150.

That is, the camera attitude estimation unit 150 searches for a rotation angle corresponding to an angle estimation condition that is set on the basis of detected feature point patterns. When the rotation angle corresponding to the angle estimation condition is found, the camera attitude estimation unit 150 generates the estimated rotation matrix ($R_{estimate}$) using a prestored corresponding rotation angle.

The pre-learned x-axis rotation angle, y-axis rotation angle, and z-axis rotation angle may be stored in the form of a lookup table (LUT) in consideration of a storage capacity of the camera attitude estimation unit 150.

To this end, the camera attitude estimation unit 150 may include, for example, a non-volatile memory.

The around view generation unit 170 uses the images captured by the image capture unit 110 to generate an around view synthesis LUT on the basis of the estimated rotation matrix ($R_{estimate}$) generated by the camera attitude estimation unit 150.

In particular, the around view generation unit 170 determines whether a road gradient is present in order to generate the around view synthesis LUT.

In this case, the around view generation unit 170 operates when a road gradient estimation command is received from the outside and determines whether a road gradient is present.

Also, the around view generation unit 170 uses an estimated rotation matrix ($R_{estimate}$) for a camera that has not changed position to determine whether a road gradient is present.

Here, the road gradient estimation command is selectively input according to a need of a user. For example, when there is a camera that has changed position due to contact or reinstallation, the user may input the road gradient estimation command.

Also, the user inputs a camera used to determine whether a road gradient is present while the user is inputting the road gradient estimation command. When the camera used to determine whether a road gradient is present is input, the user inputs a camera that has not changed position.

Specifically, the around view generation unit 170 compares the estimated rotation matrix ($R_{estimate}$) for the camera that has not changed position with the reference rotation matrix ($R_{reference}$) to determine whether a road gradient is present.

In this case, the around view generation unit 170 determines that no road gradient is present when the estimated rotation matrix ($R_{estimate}$) for the camera that has not changed position is the same as the reference rotation matrix and determines that a road gradient is present when the estimated rotation matrix ($R_{estimate}$) for the camera that has not changed position is different from the reference rotation matrix.

Also, when it is determined that no road gradient is present, the around view generation unit 170 generates an around view synthesis LUT on the basis of a currently generated estimated rotation matrix.

Conversely, when it is determined that a road gradient is present, the around view generation unit 170 calculates a rotation matrix ($R_{road\ gradient\ removal}$) for removing a rotation component caused by the road gradient such that the estimated rotation matrix is the same as the reference rotation matrix.

In this case, the around view generation unit 170 may calculate the road gradient removal rotation matrix ($R_{road\ gradient\ removal}$) for removing a road gradient component through the equation [$R_{road\ gradient\ removal} \times R_{estimate} = R_{reference}$].

Also, when the rotation matrix ($R_{road\ gradient\ removal}$) for removing a road gradient is calculated, the around view generation unit 170 generates an estimated rotation matrix ($R_{estimate}$ from which road gradient is removed) from which the road gradient is removed by applying the road gradient removal rotation matrix to an estimated rotation matrix for a camera that has changed position.

That is, the around view generation unit 170 finds the rotation matrix ($R_{road\ gradient\ removal}$) for removing a road gradient component from the estimated rotation camera for the camera that has not changed position and the reference rotation matrix, and applies the rotation matrix to the estimated rotation matrix for the camera that has changed position.

Also, the around view generation unit 170 generates the around view synthesis LUT on the basis of the generated estimated rotation matrix ($R_{estimate\ from\ which\ road\ gradient\ is\ removed}$) from which the road gradient is removed.

The elements and functions of the AVMS according to an embodiment of the present invention have been described above in detail. An operation of the AVMS according to an embodiment of the present invention will be described in detail below.

Figure 5A:
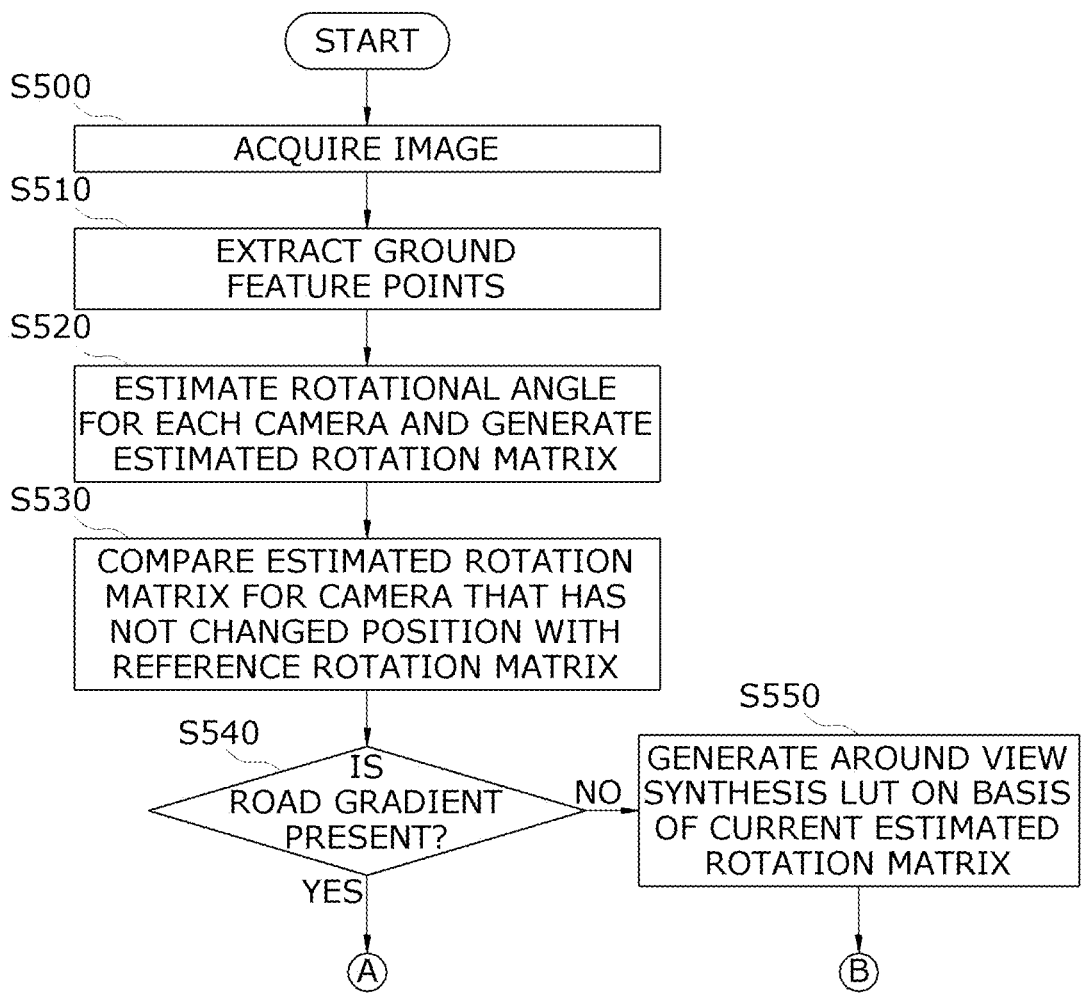

FIGS. 5A and 5B are flowcharts showing of an operational sequence of an AVMS according to an embodiment of the present invention.

The operation shown in FIG. 5 may be performed by the AVMS 100 that has been described with reference to FIGS. 1 to 4. First, images are acquired using the image capture unit 110 including cameras for capturing images in four directions, i.e., in front of, behind, to the left of, and to the right of a vehicle (S500).

Subsequently, ground feature points are extracted from the images acquired in S500 using the feature point extraction unit 130 (S510). In this case, the ground feature points may be extracted on the basis of an optical flow by performing matching on the ground feature points or by calculating a homography (a 3×3 matrix) indicating a correspondence between ground feature points of the ground surface.

Subsequently, by using the ground feature points extracted in S510, the camera attitude estimation unit 150 estimates a rotation angle for each of the cameras and generates an estimated rotation matrix including rotation angles that are estimated with respect to an x axis, a y axis, and a z axis (S520).

After S520, the around view generation unit 170 compares an estimated rotation matrix for a camera that has not changed position with a reference rotation matrix (S530) and determines whether a road gradient is present (S540).

When it is determined in S540 that no road gradient is present (no in S540), the around view generation unit 170 generates an around view synthesis LUT on the basis of the current estimated rotation matrix (S550).

Here, the around view generation unit 170 determines that no road gradient is present when the estimated rotation matrix is the same as the reference rotation matrix as a result of the comparison in S530.

Conversely, when it is determined in S540 that a road gradient is present (yes in S540), the around view generation unit 170 generates an estimated rotation matrix from which the road gradient is removed by applying a road gradient removal rotation matrix calculated using the estimated rotation matrix for the camera that has not changed position and the reference rotation matrix to an estimated rotation matrix for a camera that has changed position, and generates an around view synthesis LUT on the basis of the estimated rotation matrix from which the road gradient is removed (S560).

Here, the around view generation unit 170 determines that a road gradient is present when the estimated rotation matrix is different from the reference rotation matrix as a result of the comparison in S530.

When describing S560 in detail, the around view generation unit 170 calculates the road gradient removal rotation matrix using the estimated rotation matrix for the camera that has not changed position and the reference rotation matrix (S561).

In this case, the around view generation unit 170 may calculate the road gradient removal rotation matrix ($R_{road\ gradient\ removal}$) to remove a road gradient component through the equation [$R_{road\ gradient\ removal} \times R_{estimate} = R_{reference}$].

When the road gradient removal rotation matrix is calculated in S561, the around view generation unit 170 applies the road gradient removal rotation matrix to the estimated rotation matrix for the camera that has changed position (S562) to generate an estimated rotation matrix ($R_{estimate\ from\ which\ road\ gradient\ is\ removed}$) from which the road gradient is removed for the camera that has changed position (S563).

Subsequently, the around view generation unit 170 generates the around view synthesis LUT on the basis of the estimated rotation matrix ($R_{estimate\ from\ which\ road\ gradient\ is\ removed}$) from which the road gradient is removed, which is generated in S563 (S564).

According to an embodiment of the present invention, the AVMS may calculate a rotation matrix for removing a road gradient component using a camera that has not changed position and generate an estimated rotation matrix from which the road gradient is removed by applying the rotation matrix to an estimated rotation matrix for a camera that has changed position.

Also, the AVMS generates an around view synthesis LUT on the basis of the estimated rotation matrix from which the road gradient is removed.

Accordingly, since the around view synthesis LUT is generated on the basis of the estimated rotation matrix from which the road gradient component is removed, it is possible to enhance accuracy of an estimation of a camera attitude while a road gradient is present and enhance matching of an around view synthesis image.

Even though all of the components of the above-described embodiment of the present invention may be combined as one component or operates in combination, the invention is not limited to the embodiment. In other words, all the components may be selectively combined as one or more components to operate within the scope of the invention. Also, each component may be implemented with one independent hardware device, and some or all of the components may be selectively combined and implemented as a computer program having a program module for performing some or all functions combined in one or more hardware devices. Further, such a computer program may be stored in a computer-readable recording medium such as a universal serial bus (USB) memory, a compact disc (CD), a flash memory, or the like. The embodiment of the present invention may be implemented by reading and executing the computer program. Examples of the computer-readable recording medium may include a magnetic recording medium, an optical recording medium, a carrier wave medium, and the like.

The AVMS and the operating method thereof according to the present invention have been described according to example embodiments. However, the present invention is not limited to the exemplary embodiments. It should be apparent to those skilled in the art that various alternatives, modifications, and variations can be made to the present invention without departing from its spirit and scope.

Accordingly, the embodiment and the accompany drawings of the present invention are to be considered descriptive and not restrictive of the invention, and do not limit the technical scope of the invention. The scope of the invention should be construed by the appended claims, and all technical ideas within the scope of their equivalents should be construed as being included in the scope of the invention.

What is claimed is:

1. An around view monitoring system (AVMS) comprising:
    an image capture unit configured to acquire images by performing capturing in front of, behind, to a left side, and to a right side of a vehicle using cameras;
    a feature point extraction unit configured to extract ground feature points from each of the images acquired by the image capture unit;
    a camera attitude estimation unit configured to estimate a rotation angle for each of the cameras with reference to a ground surface using the ground feature points and generate an estimated rotation matrix including the estimated rotation angle; and
    an around view generation unit configured to determine whether a road gradient is present on the basis of the estimated rotation matrix of each of the cameras and generate an around view synthesis lookup table (LUT) on the basis of the currently generated estimated rotation matrix or generate an estimated rotation matrix from which the road gradient is removed and generate the around view synthesis LUT on the basis of the estimated rotation matrix from which the road gradient is removed,
    wherein the around view generation unit is configured to compare an estimated rotation matrix for a camera that has not changed position, which is input from the outside, with a reference rotation matrix that is pre-stored in association with the camera and determine whether a road gradient is present,
    wherein the around view generation unit is configured to determine that no road gradient is present when the estimated rotation matrix is the same as the reference rotation matrix, and determine that a road gradient is present when the estimated rotation matrix is different from the reference rotation matrix,
    wherein when a road gradient is present, the around view generation unit is configured to generate the estimated rotation matrix from which the road gradient is removed and generate the around view synthesis LUT on the basis of the estimated rotation matrix from which the road gradient is removed.

2. The AVMS of claim 1, wherein when no road gradient is present, the around view generation unit is configured to generate the around view synthesis LUT on the basis of the currently generated estimated rotation matrix.

3. The AVMS of claim 1, wherein the around view generation unit is configured to calculate a rotation matrix for removing a road gradient component, generate the estimated rotation matrix from which the road gradient is removed by applying a road gradient removal rotation matrix to an estimated rotation matrix for a camera that has changed position, and generate the around view synthesis LUT on the basis of the estimated rotation matrix from which the road gradient is removed.

4. The AVMS of claim 3, wherein the around view generation unit is configured to calculate the road gradient removal rotation matrix through an equation [$R_{road\ gradient\ removal} \times R_{estimate} = R_{reference}$].

5. An operating method of an AVMS, the operating method comprising:
    acquiring images by performing capturing in front of, behind, to a left side, and to a right side of a vehicle using cameras;
    extracting ground feature points from each of the acquired images;

estimating a rotation angle for each of the cameras using the ground feature points and generating an estimated rotation matrix including the estimated rotation angle;

determining whether a road gradient is present by comparing an estimated rotation matrix for a camera that has changed position with a reference rotation matrix; and generating an around view synthesis LUT on the basis of the currently generated estimated rotation matrix or generating an estimated rotation matrix from which the road gradient is removed and generating the around view synthesis LUT on the basis of the estimated rotation matrix from which the road gradient is removed, depending on a result of determining whether a road gradient is present, wherein the determining of whether a road gradient is present comprises comparing an estimated rotation matrix for a camera that has not changed position, which is input from the outside, with a reference rotation matrix that is prestored in association with the camera to determine whether a road gradient is present, wherein the determining of whether a road gradient is present comprises determining that no road gradient is present when the estimated rotation matrix is the same as the reference rotation matrix and determining that a road gradient is present when the estimated rotation matrix is different from the reference rotation matrix, wherein the generating of an around view synthesis LUT comprises:

generating the around view synthesis LUT on the basis of a current estimated rotation matrix when no road gradient is present and generating the estimated rotation matrix from which the road gradient is removed and generating the around view synthesis LUT on the basis of the estimated rotation matrix from which the road gradient is removed when the road gradient is present, wherein the generating of the around view synthesis LUT on the basis of the estimated rotation matrix from which the road gradient is removed comprises calculating a rotation matrix for removing a road gradient component, generating the estimated rotation matrix from which the road gradient is removed by applying a road gradient removal rotation matrix to the estimated rotation matrix for the camera that has changed position, and generating the around view synthesis LUT on the basis of the estimated rotation matrix from which the road gradient is removed.

6. The operating method of claims 5, wherein the road gradient removal rotation matrix is calculated through an equation $[R_{road\ gradient\ removal} \times R_{estimate} = R_{reference}]$.

* * * * *